(12) United States Patent
Barnett

(10) Patent No.: US 7,416,193 B1
(45) Date of Patent: Aug. 26, 2008

(54) CARPENTER SAW TRANSPORTER ASSEMBLY

(76) Inventor: Thomas S. Barnett, 1102 Millard, Royal Oak, MI (US) 48073

( * ) Notice: Subject to any disclaimer, the term of this patent is extended or adjusted under 35 U.S.C. 154(b) by 0 days.

(21) Appl. No.: 11/846,037

(22) Filed: Aug. 28, 2007

(51) Int. Cl.
*B25H 1/00* (2006.01)

(52) U.S. Cl. .................. 280/30; 280/47.27; 280/47.33; 280/47.18; 280/652; 280/659; 280/640

(58) Field of Classification Search ............. 280/47.27, 280/47.24, 47.26, 47.28, 47.29, 79.11, 79.2, 280/47.34, 47.35, 47.33, 47.18, 652, 659, 280/640, 30; 144/285, 286.5, 286.1
See application file for complete search history.

(56) References Cited

U.S. PATENT DOCUMENTS

| | | | | |
|---|---|---|---|---|
| 3,027,885 | A * | 4/1962 | Zuzelo | 125/13.01 |
| 3,635,206 | A * | 1/1972 | Harclerode | 125/13.03 |
| 4,640,326 | A * | 2/1987 | Hewitt | 144/287 |
| 5,431,206 | A * | 7/1995 | McAllister | 144/286.1 |
| 5,664,612 | A * | 9/1997 | Klemma | 144/286.1 |
| 6,273,081 | B1 * | 8/2001 | Gorgol et al. | 125/13.01 |
| 6,419,440 | B1 * | 7/2002 | Smith | 414/460 |
| 7,086,434 | B2 * | 8/2006 | Lee | 144/286.1 |
| 7,089,980 | B2 * | 8/2006 | Rulli | 144/286.1 |
| 7,213,829 | B2 * | 5/2007 | Wu | 280/645 |
| 2003/0047895 | A1 * | 3/2003 | McElroy | 280/79.3 |
| 2006/0038383 | A1 * | 2/2006 | Wu | 280/652 |
| 2006/0071450 | A1 * | 4/2006 | Wu | 280/642 |
| 2006/0076756 | A1 * | 4/2006 | Wu | 280/652 |

* cited by examiner

*Primary Examiner*—Christopher Ellis
*Assistant Examiner*—Cynthia F. Collado
(74) *Attorney, Agent, or Firm*—Dickinson Wright, PLLC

(57) ABSTRACT

The carpenter saw transporter assembly (20) includes a rectangular plate (32) with a flange (44) for supporting the saw machine (22). A plurality of wheel assemblies (46) are mounted on the flange (44) for transporting the saw machine (22). A mounting rail (52) has a width ($W_t$) less than the width ($W_p$) of the plate (32) and is disposed on the plate (32) and presents male or female undercuts (58) between a top portion (54) and a bottom portion (56). The saw machine (22) includes clamps (28) that can be inserted under and mechanically retained by the undercuts (58). A handle tunnel (62) extends into the mounting rail (52) for disposing a slidable handle (60). A locking mechanism (76) is disposed on the mounting rail (52) for locking the handle (60) in various positions. A plurality of docking strips (82) are disposed on the plate (32) for elevating the position of which the clamps (28) are received and eliminating mechanical contacts between the plate (32) and the cranks (30).

9 Claims, 5 Drawing Sheets

CARPENTER SAW TRANSPORTER ASSEMBLY

BACKGROUND OF THE INVENTION

1. Field of the Invention

The subject invention relates to a carpenter saw transporter assembly useful for transporting a carpenter's saw machine.

2. Description of the Prior Art

Various carpenter saw transporter assemblies are well known in the prior art which include a plate for mechanically support the saw machine. A plurality of locking devices are disposed on the plate for retaining the saw machine. A plurality of wheel assemblies are included for transporting the saw machine. An example of such a saw transporter assembly is shown in U.S. Pat. No. 7,086,434 to Lee.

SUMMARY OF THE INVENTION AND ADVANTAGES

The invention provides a carpenter saw transporter assembly including a mounting rail secured to the top surface of the rectangular plate and extending between the top edge and the bottom edge of the plate. The width of the mounting rail is less than the width of the plate between the side edges.

Accordingly, the subject invention provides a carpenter saw transporter that can secure the saw machine on the mounting rail without additional locking devices disposed on the plate and the plate effectively protects the saw from lateral contact and possible damage.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
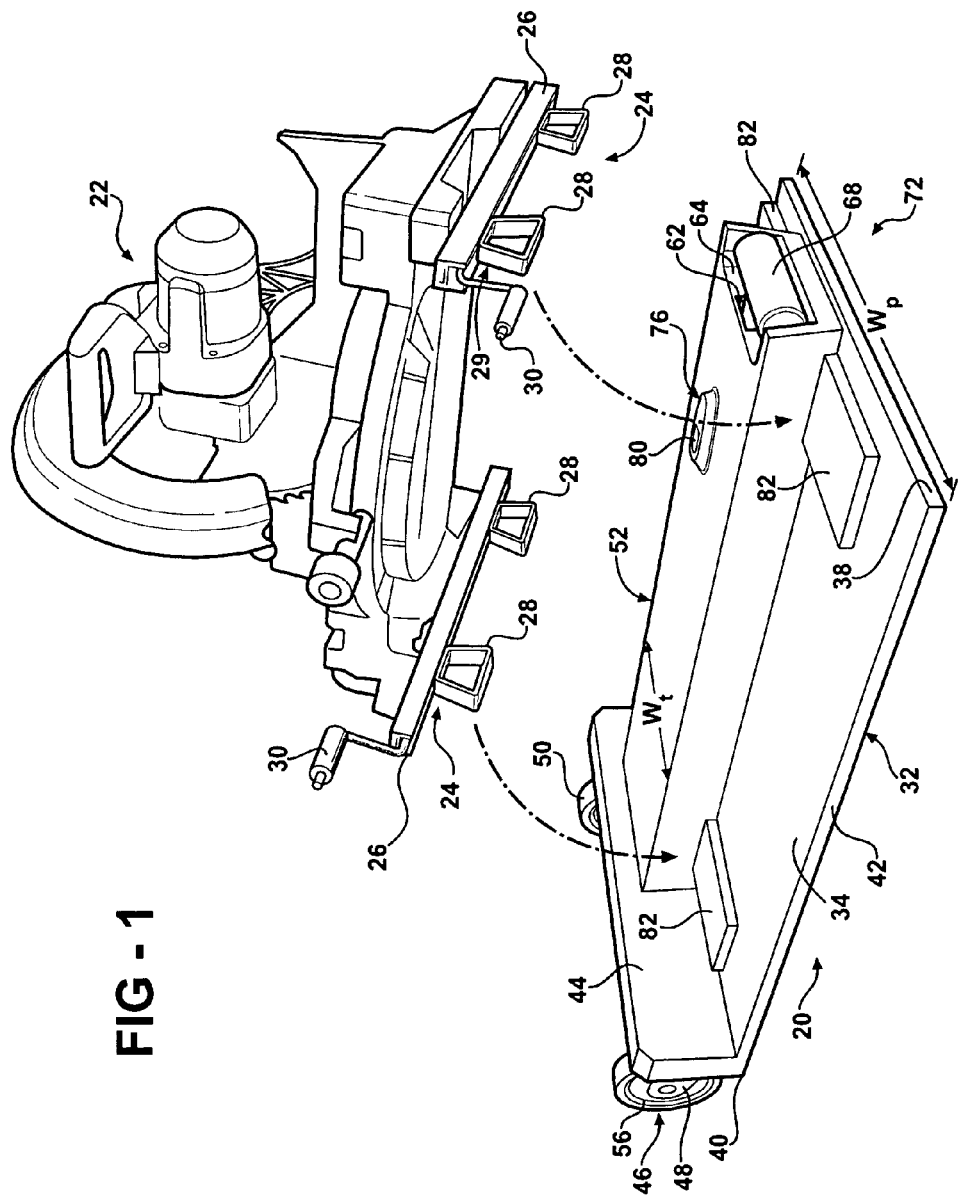
FIG. 1 is a perspective view of a carpenter saw transporter assembly from which a saw machine is dissociated in accordance with the subject invention.

Referring to the Figures, wherein like numerals indicate corresponding parts throughout the several views, a carpenter saw transporter assembly 20 constructed in accordance with the subject invention is generally shown in FIG. 1. Also generally shown in FIG. 1 is an exemplary saw machine 22.

The saw machine 22 includes a plurality of clamp mechanisms 24 generally indicated. Each clamp mechanism 24 includes a clamp beam 26 of a C-shaped channel and two clamp elements 28 slidably supported by the beam 26. A screw (not shown) is disposed in each beam 26 and is rotated by a crank 30. Rotation of the crank 30 moves one or both clamp elements 28 on each beam 26 rectilinearly relative to each other, i.e., toward and away from each other. The clamp elements 28 are of such a shape that they present a male protrusion be inserted under and mechanically retained by the undercuts 58.

Figure 2:
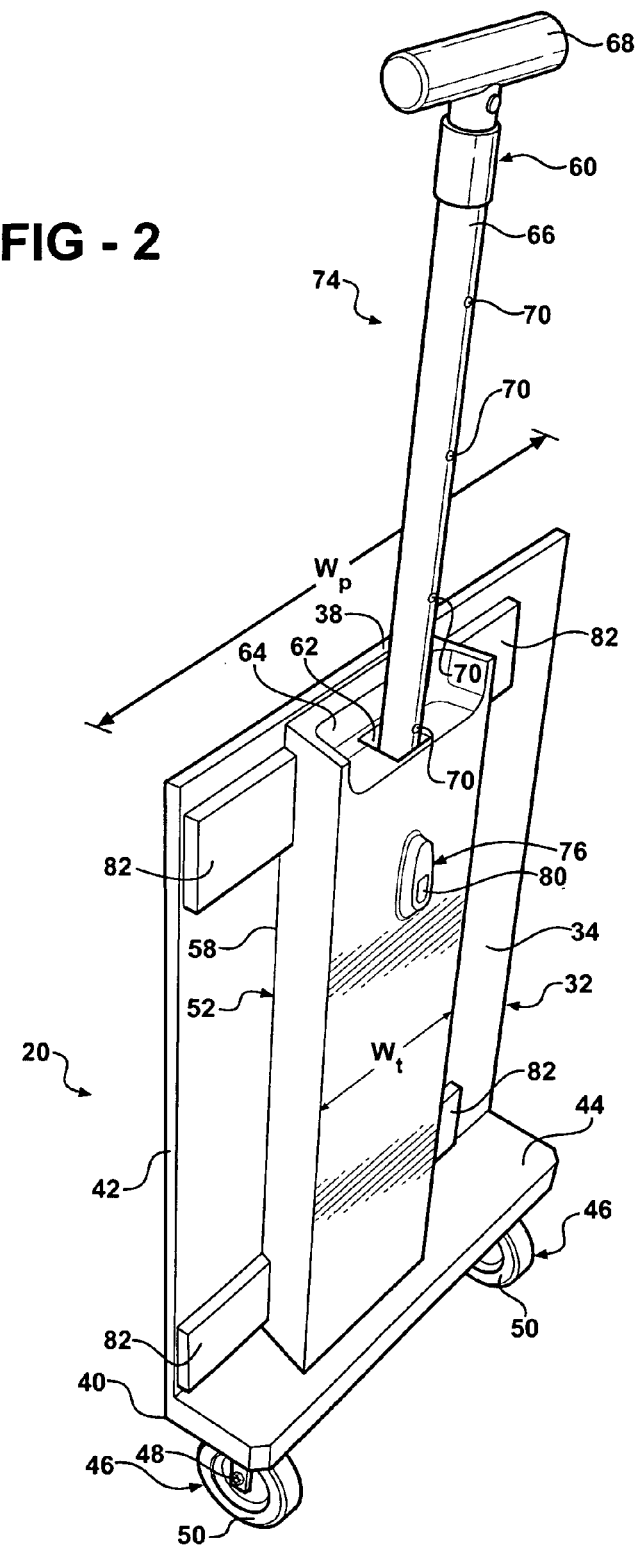
FIG. 2 is a perspective view of the carpenter saw transporter assembly in a upright state wherein a handle is in a fully extended position.
Figure 3:
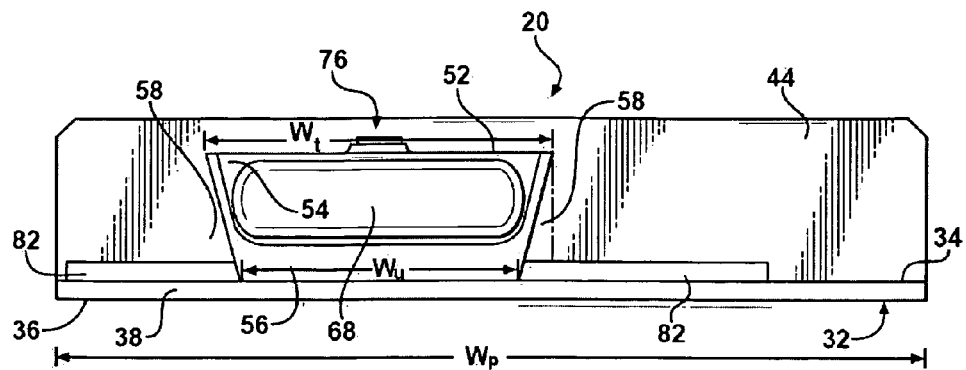
FIG. 3 is an end view of the carpenter saw transporter assembly wherein the handle is in a retracted position.

As shown in FIG. 1 and FIG. 2, the carpenter saw transporter assembly 20 is fabricated from a rectangular plate 32 generally indicated having a top surface 34 and a parallel bottom surface 36. The plate 32 defines a top edge 38 and a bottom edge 40 interconnected by side edges 42. A rectangular flange 44 is disposed along the bottom edge 40 and is perpendicular to the top surface 34 of the plate 32. The size of the plate 32 is large enough to prevent the saw machine 22 from engaging in any lateral contact which could occur during transportation when the carpenter saw transporter assembly 20 is vertical or flat, as in being disposed on the bed of a truck.

Figure 4:
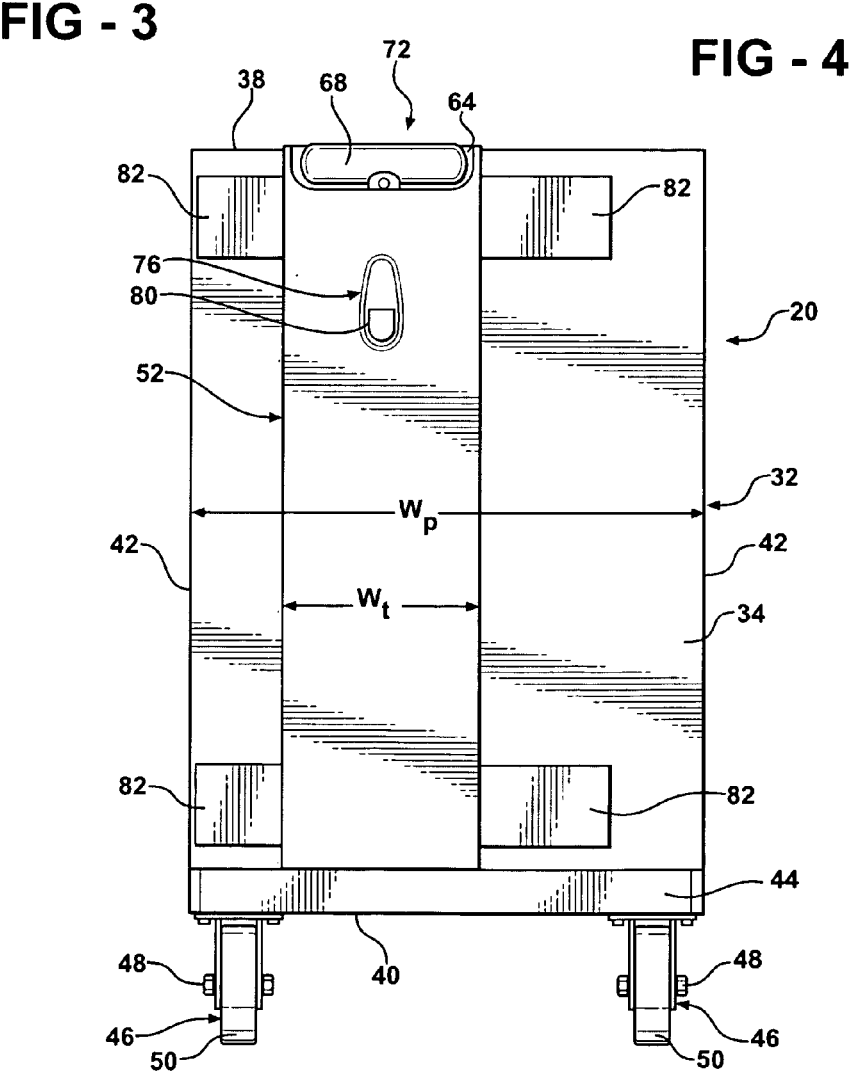
FIG. 4 is a top elevation view of FIG. 3.

As shown in FIG. 4, a plurality of wheel assemblies 46 are generally indicated and are mounted on the flange 44. Each of the wheel assemblies 46 includes a bracket 48 and a wheel 50. The bracket 48 is U-shaped and is attached to the flange 44 with the two legs of the U-shape extending away from the bottom edge 40 of the plate 32. Each wheel 50 is supported between the two legs of the bracket 48 and can rotate freely during transportation to support the entire assembly and the saw machine 22.

Figure 5:
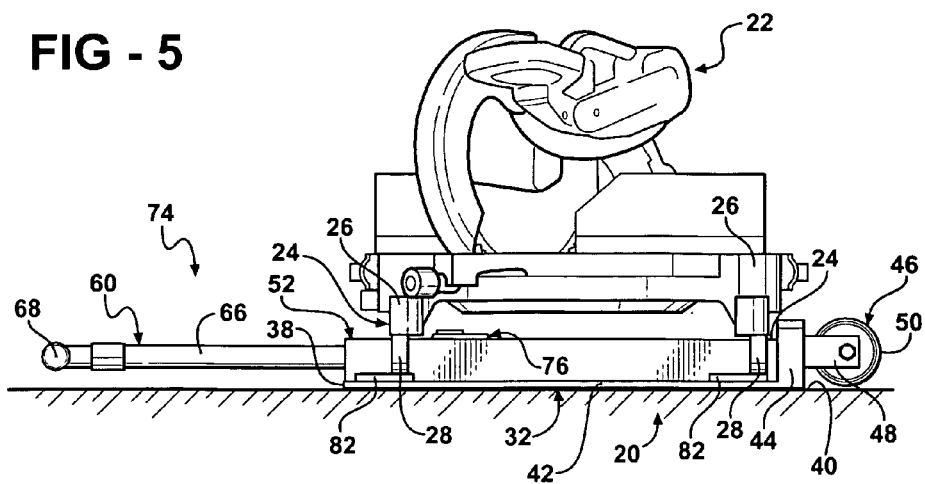
FIG. 5 is a side view of the carpenter saw transporter assembly on which the saw machine is mounted wherein the handle is in an extended position.
Figure 6:
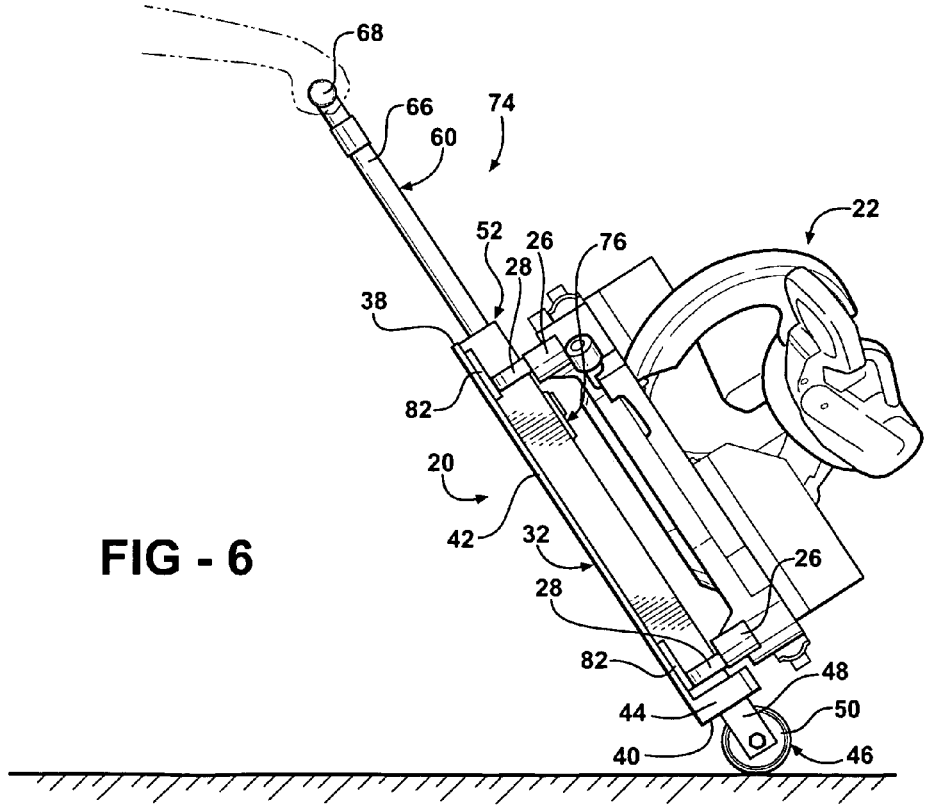
FIG. 6 is a side view of the carpenter saw transporter assembly on which the saw machine is mounted wherein the handle is in an extended position and is being gripped by an user and in motion.
Figure 7:
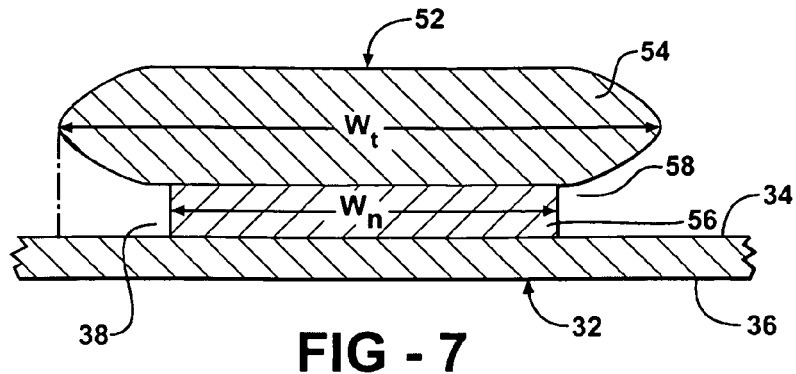
FIG. 7 is a cross-sectioned view of a second type of mounting rail of the subject invention.
Figure 8:
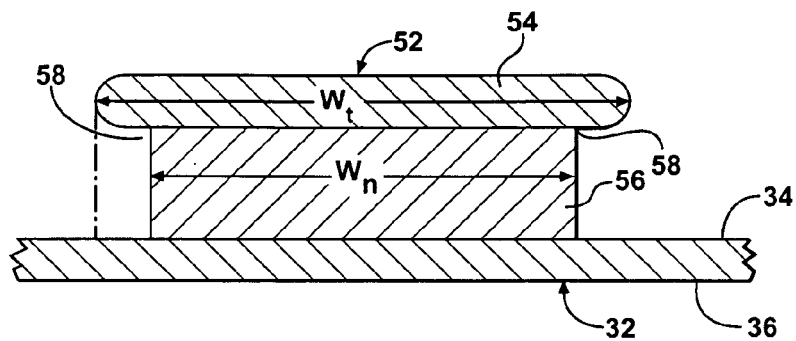
FIG. 8 is a cross-sectioned view of a third type of mounting rail of the subject invention.
Figure 9:
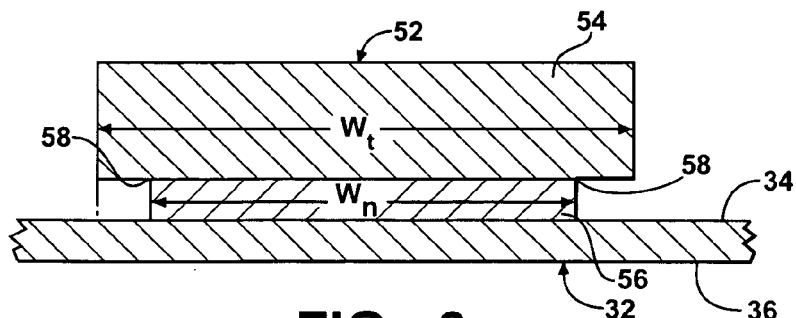
FIG. 9 is a cross-sectioned view of a fourth type of mounting rail of the subject invention.
Figure 10:
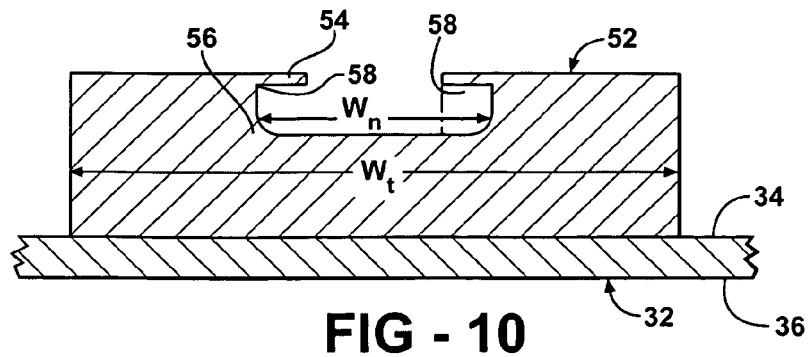
FIG. 10 is a cross-sectioned view of a fifth type of mounting rail of the subject invention.

The carpenter saw transporter assembly 20 is characterized by a mounting rail 52 generally indicated secured to the top surface 34 of the plate 32. The mounting rail 52 extends between ends at the top edge 38 and at the flange 44 at the bottom edge 40. All embodiments of the mounting rail 52 include an undercut 58 for receiving the clamp mechanisms 24 and thus mechanically retaining the saw machine 22. The mounting rail 52 includes a top portion 54 and a bottom portion 56 interconnected by a middle portion. In all embodiments, the width of the mounting rail Wt defined by the top portion 54 is narrower than the width of the plate Wp between the side edges 42 and wider than the width of the undercut Wu between the top portion 54 and the bottom portion 56. In the embodiment of FIGS. 1-6 the middle portion is defined by inwardly-tapered side faces and presents an undercut 58 for receiving and mechanically retaining the clamp mechanism 24 of the saw machine 22. Thusly, the outwardly-tapered side faces of the clamp mechanisms 24 can be received and mechanically retained. As illustrated in FIGS. 7-9, the mounting rail 52 can have different overall shapes in cross-section to present a male-shape with a wider top portion 54 and a narrower bottom portion 56 to present undercuts 58 for receiving the clamp mechanisms 24. Alternatively, as shown in FIG. 10, the mounting rail 52 can also have a female-shape, as long as the mounting rail 52 has undercuts 58 for the clamp mechanisms 24 to be mechanically retained. When the mounting rail 52 is male-shaped, the two clamp elements 28 will be moved closer for tightening the contact on the mounting rail 52, or to move the two clamp elements 28 apart for loosening that contact. On the other hand, when the mounting rail 52 is female shaped, as illustrated in FIG. 10, moving the clamp elements 28 closer by the clamp controller will loosen the contact between the clamp elements 28 and the mounting rail 52, while moving the clamp elements 28 apart by the clamp controller will tighten that contact. No matter which design is used, the undercuts 58 of the mounting rail 52 receive a clamp mechanism 24 of a saw machine 22 to be mechanically retained.

As shown in FIGS. 1 and 2, the mounting rail 52 of includes a handle tunnel 62 extending into the end of the mounting rail 52 for receiving a movable handle 60, generally indicated. A grip recess 64 is disposed on the end of the mounting rail 52 at or adjacent the top edge 38 of the plate 32 and extends transverse to the handle tunnel 62. The handle tunnel 62 opens into the grip recess 64 adjacent the top edge 38 of the plate 32. The movable handle 60 comprises a rod 66 and a handgrip 68. The rod 66 is slidably disposed inside the handle tunnel 62 and has a plurality of spaced locking holes 70 therealong for being locked in either a retracted position 72 or various extended positions 74. The handgrip 68 extends transversely and is attached to the rod 66. The handgrip 68 is disposed in the grip recess 64 when the handle 60 is in the retraced position. The retracted position 72 of the handle 60 is shown in FIG. 4, and the fully extended position 74 of the handle 60 is shown in FIG. 2.

A locking mechanism 76 is generally indicated and is disposed on the mounting rail 52 and includes a retractable lock (not shown) controlled by a button 80. Pressing the button 80 lifts the lock from one of the locking holes 70, and thus unlocks the rod 66. Users can then pull or push the handgrip 68 to move the rod 66, until the handle 60 is adjusted to a desired position. On the other hand, releasing the button 80 allows the lock to be inserted in the locking hole 70 positioned immediately underneath the lock, and thus locks the rod 66 in that specific extended position 74.

In addition, a plurality of docking strips 82 are disposed on the top surface 34 of the plate 32 and extend from both sides of the mounting rail 52. As best shown in FIGS. 5 and 6, by elevating the position of the clamp mechanisms 24, the docking strips 82 eliminate any mechanical contact between the plate 32 and the cranks 30 when the saw machine 22 is already positioned on the plate 32 and the user is adjusting the position of the clamp elements 28 by winding the crank 30. In other words, the strips 82 prevent interference between cranks 30 and the top surface 34 of the plate 32.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A carpenter saw transporter assembly (20) comprising;
   a plate (32) having a top surface (34) and a parallel bottom surface (36) of a rectangular periphery defining a top edge (38) and a bottom edge (40) interconnected by side edges (42), and
   a mounting rail (52) secured to said top surface (34) of said plate (32) and extending between ends of said top edge (38) and said bottom edge (40) of said plate (32), and
   characterized by the width (Wt) of said mounting rail (52) being less than the width (Wp) of said plate (32) between said side edges (42), and
   said mounting rail including a cross-section presenting a top portion (54) defining said width ($W_t$) of said mounting rail and a bottom portion (56) and presenting an undercut (58) having a narrower width ($W_u$) between said top portion (54) and said bottom portion (56) for receiving and mechanically retaining the clamp mechanisms (24) of the saw machine (22).

2. A carpenter saw transporter assembly (20) as set forth in claim 1 wherein said undercuts (58) present one of a male and female shape.

3. A carpenter saw transporter assembly (20) as set forth in claim 1 including a handle tunnel (62) extending into said mounting rail (52) and a handle (60) movable in said handle tunnel (62) between a retracted position (72) and various extended positions (74).

4. A carpenter saw transporter assembly (20) as set forth in claim 3 wherein said handle (60) including a rod (66) having a plurality of spaced locking holes (70) therealong slidably disposed in said handle tunnel (62) and a handgrip (68) extending transversely and attached to said rod (66).

5. A carpenter saw transporter assembly (20) as set forth in claim 4 including a locking mechanism (76) disposed on said mounting rail (52) and including a lock for insertion into said locking holes (70) in said rod (66) to lock said handle (60) in any one of said various extended positions (74) and including a button (80) for releasing said lock from said locking holes (70) for moving said rod (66) between said retracted position (72) and said various extended positions (74).

6. A carpenter saw transporter assembly (20) as set forth in claim 4 including a grip recess (64) disposed in end of said mounting rail (52) at said top edge (38) and transverse to said handle tunnel (62) for receiving said handgrip (68) in said retracted position (72).

7. A carpenter saw transporter assembly (20) as set forth in claim 1 including a plurality of docking strips (82) disposed on said top surface (34) of said plate (32) for receiving the clamp mechanisms (24) of the saw machine (22) at an elevated position for avoiding direct contact between said plate (32) and the movable parts of the saw machine (22).

8. A carpenter saw transporter assembly (20) as set forth in claim 1 including a flange (44) of rectangular periphery extending along said bottom edge (40) and perpendicular to said top surface (34) of said plate (32) and a plurality of wheel assemblies (46) mounted on said flange (44) and extending away from said bottom edge (40).

9. A carpenter saw transporter assembly (20) comprising;
   a plate (32) having a top surface (34) and a parallel bottom surface (36) of a rectangular periphery defining a top edge (38) and a bottom edge (40) interconnected by side edges (42),
   a flange (44) of rectangular periphery extending along said bottom edge (40) and perpendicular to said top surface (34) of said plate (32),
   a plurality of wheel assemblies (46) mounted on said flange (44) and extending away from said bottom edge (40),
   each of said wheel assemblies (46) including a bracket (48) attached to said flange (44) and a wheel (50) rotatably supported by said bracket (48),
   a mounting rail (52) of a cross-section defining a top portion (54) and a bottom portion (56) secured to said top surface (34) of said plate (32) interconnected by a middle portion having inwardly tapered side faces and extending between ends at said top edge (38) and said flange (44) at said bottom edge (40) and presenting an undercut (58) for receiving and mechanically retaining the clamp mechanisms (24) of a saw machine (22), the width (Wt) of said mounting rail (52) defined by said top portion (54) being narrower than the width (Wp) of said plate (32) between said side edges (42) and wider than the width (Wu) of said undercut (58) between said top portion (54) and said bottom portion (56), said mounting rail (52) including a grip recess (64) in said end at said top edge (38) and a handle tunnel (62) extending into said mounting rail (52) from said grip recess (64), a handle (60) movable in said handle tunnel (62) between a retracted position (72) and various extended positions (74), said handle (60) including a rod (66) slidably disposed in said handle tunnel (62) and a handgrip (68) extending transversely and attached to said rod (66) for disposition in said grip recess (64) in said retracted position (72) of said rod (66), said rod (66) presenting a plurality of spaced locking holes (70) therealong, a locking mechanism (76) disposed on said top face of said mounting rail (52) and including a retractable lock for insertion into locking holes (70) in said rod (66) to lock said handle (60) in any one of said various extended positions (74) and including a button (80) for releasing said lock from said locking holes (70) for moving said rod (66) between said retracted position (72) with said handgrip (68) in said grip recess (64) and said various extended positions (74), and a plurality of docking strips (82) disposed on said top surface (34) of said plate (32) and extending from both sides of said mounting rail (52) for respectively receiving the clamp mechanisms (24) of the saw machine (22) at an elevated position for avoiding direct contact between said plate (32) and the movable parts of the saw machine (22).

\* \* \* \* \*